July 11, 1961

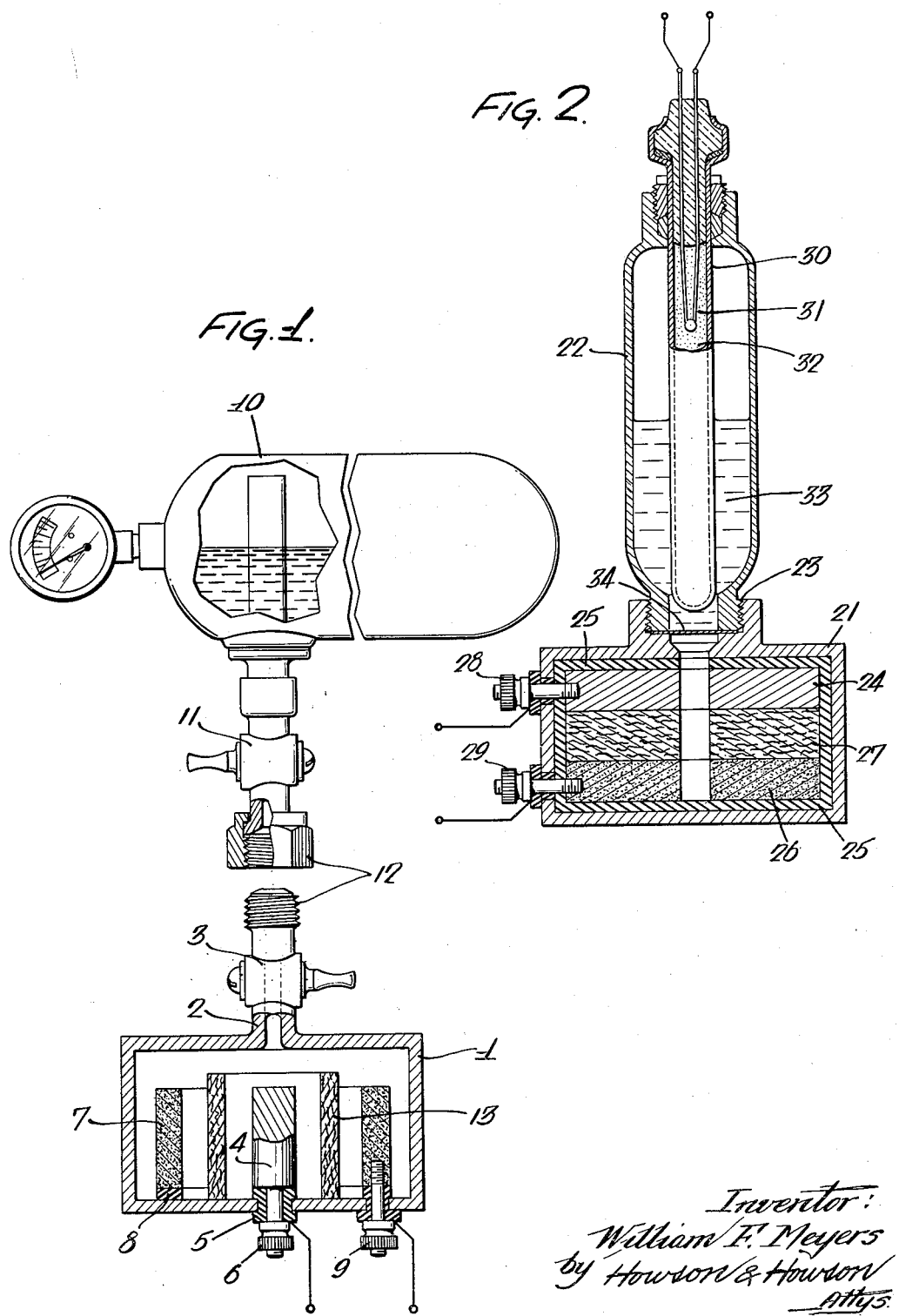

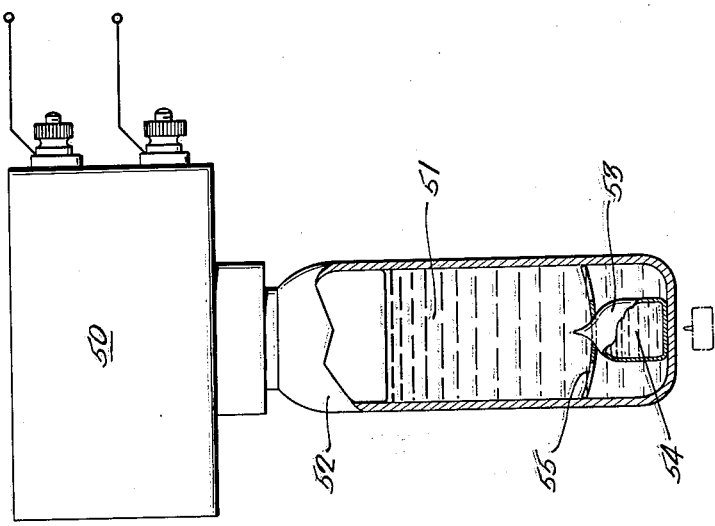
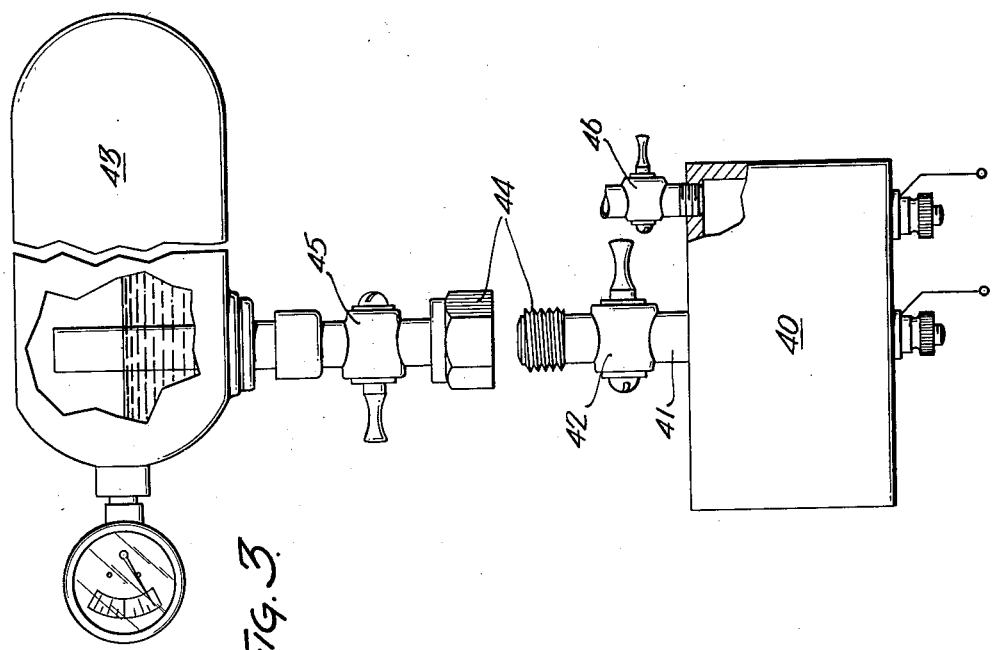

W. F. MEYERS 2,992,289

CURRENT-PRODUCING CELL DEVICE AND
METHOD OF GENERATING CURRENT

Filed May 10, 1957

Inventor:
William F. Meyers
by Howson & Howson
Attys.

United States Patent Office 2,992,289
Patented July 11, 1961

2,992,289
CURRENT-PRODUCING CELL DEVICE AND METHOD OF GENERATING CURRENT
William F. Meyers, Norristown, Pa., assignor to G. & W. H. Corson, Inc., Plymouth Meeting, Pa., a corporation of Delaware
Filed May 10, 1957, Ser. No. 658,311
11 Claims. (Cl. 136—90)

The present invention relates to a novel electric current-producing cell and to a method of generating current using the same; and, more particularly, the invention relates to a novel reserve energizer type cell having extremely long shelf life which is capable of extremely rapid activation and possesses other novel characteristics.

Liquid activated electric current-producing cells, such as for deferred emergency use, "one-shot" reserve energizers, and the like, are well known. In such cell systems, the electrolyte as a whole, such as a sulfuric acid solution, is usually admitted to the cell already containing the other components needed to provide an operable cell at the time it is desired that the cell function. There are, however, certain limitations and disadvantages with such liquid activated cell systems that have held back their widespread use. Many of these problems are severely aggravated by series cell connection as found in most battery applications from flashlights and automobile batteries to electronic equipment power packs. Admission of conducting electrolyte to a plurality of cells is characterized by unreliable and segmental hand operations or elaborate equipment. Automatic electrolyte charging equipment in general causes temporary and in many cases sustained intercell shorts resulting in wasted energy and noisy electrical output. Uneven filling, flooding, sensitivity to position or acceleration, partial filling, and required stand time must also be accepted or the equipment and cells further increased in complexity.

Because of these difficulties it has been suggested to activate a cell by admititng only the water, the cell already containing the electrolyte solute. However, the solution of the solid electrolyte is generally slower than the above and flooding underfilling, uneven filling, and sensitivity to position or acceleration even more serious problems.

In a specific development it has been suggested to activate a certain type of cell, which already contains the essential components, including electrolyte, but which is relatively inactive due to polarization, by the admission of chlorine gas to depolarize the cell. The overall admission of chlorine gas to such a cell results in rapid degradation of the anode, and channelling of the gas to cathodes in series connection again causes complexity, an undesirable feature from both the economic and reliability standpoints.

It is the principal object of the present invention to provide a deferred action, electric current-producing cell which possesses all of the advantages of prior liquid-activated, deferred action cells, but which does not possess the limitations and disadvantages thereof.

It is another object of the present invention to provide a deferred action electric current-producing cell in which activation can be substantially instantaneous.

Still another object of the present invention is to provide a deferred action electric current-producing cell in which there is little or no danger of short circuiting during activation despite position or acceleration, and in which there is little or no problem concerning wetting of elements or components with electrolyte which it is not desired so to wet.

A further object of the present invention is to provide a novel method for chemically generating current upon demand.

A specific object is to provide a deferred action, electric current-producing cell capable of producing a high potential upon demand under widely varying temperature conditions including temperatures well below the freezing point of water.

A further specific object is to provide a deferred action, electric current-producing cell capable of being partially or fully activated, tested and returned to the inactive state without unduly reducing service characteristics.

Still another specific object of the invention is to provide a referred action electric current-producing cell involving the transfer of heat during activation to the site required to overcome possible low temperature conditions, Other objects will become apparent from a consideration of the following specification and the claims.

In operating in accordance with the present invention ammonia in vapor form is introduced into a cell compartment comprising all the components required for an operable current-producing cell, including anode, cathode and electrolyte solute, except the electrolyte solvent, whereby the vaporized, ammonia upon contacting the electrolyte solute is absorbed thereby and condenses and dissolves said solute forming the electrolyte and completing the cell.

The potential electric current-producing cell of this invention comprises a cell compartment comprising an anode, a cathode and electrolyte solute free of any electrolyte solvent, and means for introducing ammonia in the vapor state to said compartment. The device, in the form of a complete self-contained unit, comprises a cell compartment comprising an anode, a cathode and electrolyte solute free of an electrolyte solvent, and means for introducing ammonia in the vapor state to said compartment including a separate container adapted to deliver ammonia in the form of a vapor, said cell compartment and said separate container being in potential gas flow relationship, and means for obtaining open gas-flow between the interior of said compartment and said separate container.

In one preferred embodiment of the device in the form of a self-contained unit, the container for the ammonia is provided with means for heating the ammonia to facilitate its introduction in vapor form into the cell compartment.

The cell system of the present invention will be more readily understood from a consideration of the drawings in which:

FIGURE 1 is a side elevation view, in section, of one cell embodiment;

FIGURE 2 is a side elevational view, partly in section, of another cell embodiment of the present invention;

FIGURE 3 is a side elevational view, partly in section, of another cell embodiment of the present invention;

FIGURE 4 is a side elevational view, partly in section, of still another cell embodiment of the present invention;

Figure 5:
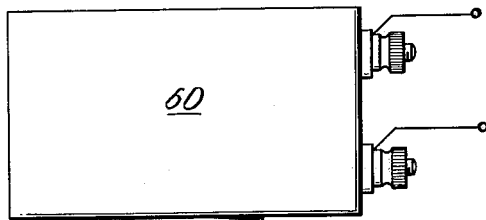
FIGURE 5 is a side elevational view, partly in section, of a cell embodiment having heating means associated with the ammonia.

To introduce the ammonia to the cell compartment in vapor form the ammonia may be held isolated in a container separate from the cell compartment, and at the time introduction of the ammonia into the cell compartment is initiated there will be a pressure differential between the ammonia container and the cell compartment to insure liberation of the ammonia as a vapor into the cavity of the cell compartment. This liberation may be substantially instantaneous or the rate may be controlled to provide more gradual release, or even intermittent release, of the ammonia vapor into the cell compartment. This pressure differential may be obtained either by providing a vacuum in the cell compartment or by providing elevated pressure conditions in the ammonia container or by a combination of these. The application of heat to the ammonia facilitates the vaporization thereof into the cell compartment. Advantageously the ammonia is under sufficient pressure in its container to maintain it in liquid form therein.

The ammonia may not exist as such up until the time it is desired to activate the cell, but may be formed through reaction. The initiation of such reaction with the resultant formation of the ammonia in the vapor state may thus serve to initiate activation of the cell, the ammonia formed by the reaction being injected into the cell. Herein where reference is made generally to ammonia before injection into the cell compartment it will be understood to include a material or materials adapted to form, upon decomposition or reaction, the desired ammonia. An example of this embodiment, involving decomposition, is the deammoniation of barium amide, $Ba(NH_2)_2$, upon heating to form ammonia and barium nitride, $Ba_3N_2$. A further illustration of this embodiment, involving reaction, is the reaction of barium amide with ammonium sulfate forming ammonia and barium sulfate.

At the time it is desired to activate the cell, free open gas flow between the ammonia container and the cell compartment cavity is established so that the ammonia, by virtue of the release in pressure, floods the cell compartment as a vapor. The ammonia may be held in a container separate and outside of the cell compartment and may be permanently attached to the cell compartment or may be attachable and merely connected to the cell compartment when desired to activate the cell. For example, the ammonia container and cell compartment may be joined to form a self-contained unit, or the ammonia may be held in a common reservoir, such as a conventional portable pressure storage cylinder which, through suitable connections, can be attached to the cell compartment at will for introduction of ammonia vapor thereinto. In either of these situations a valve, rupturable seal, or other device may be located between the ammonia container and cell compartment by which the stated open gas flow relationship may be established. On the other hand, the ammonia container may be positioned within the cell compartment, such as in the form of a frangible ampoule or container having a rupturable wall portion.

Once the ammonia, in vapor form, is introduced to the cell compartment cavity it quickly migrates to all available parts of the cavity. Upon contacting the solute, however, it is rapidly absorbed thereby, condensing and forming a solution of the electrolyte solute preferentially at the site of the solute. This condensation is aided and retained by the vapor pressure lowering of solute upon the ammonia and transiently by any temperature differential between the cell compartment and ammonia container particularly when heat is applied to the ammonia in its container. The condensation of the ammonia vapor at the solute site also serves to maintain a pressure differential between the released ammonia and the site of the solute until the desired amount of ammonia has permeated the solute to form the electrolyte solution.

In copending applications Serial Nos. 317,136 and 546,364, filed October 27, 1952 and November 14, 1955, respectively, now Patents 2,863,933 and 2,937,219, respectively, are disclosed and claimed cell systems in which the principal electrolyte solvent is liquid ammonia, and the disclosures of said patents are incorporated by reference herein. The present invention is particularly adapted to such cell systems, it being only necessary that the ammonia serving as solvent for the electrolyte in such cell systems be held isolated in a separate container and released in vapor form, to the cell compartment containing the anode, cathode and electrolyte solute at the time of activation, whereby it condenses and dissolves the electrolyte solute forming the desired electrolyte solution.

As pointed out in said patents, theoretically, liquid ammonia ionizes mainly into the ammonium ($NH_4$) ion and amide ($NH_2-$), amide ($NH=$) and nitride ($N\equiv$) ions, the ammonium ions corresponding to the hydrogen ions of the aqueous system and the amide, imide and nitride ions corresponding to the hydroxyl ions of the aqueous system. However, as a practical matter, liquid ammonia ionizes so little as to provide, by itself, negligible conductivity. In the liquid ammonia system, ammonium compounds provide ammonium ions and hence ammonium hydroxide is actually a weak acid with respect to liquid ammonia, and ammonium salts, such as ammonium thiocyanate, are actually strong acids. Water, since it forms ammonium ions in the liquid ammonia system, functions as a weak acid. The addition of water to liquid ammonia is similar to adding ammonium hydroxide. By the same token, the addition of an acid (HA) results in the formation of ammonium ions and hence produces acidity ($NH_4A$) in the liquid ammonia system. The bases in the liquid ammonia system, the amides, imides and nitrides, are in general, insufficiently soluble for practical electrolyte compositions. There are many analogies between the function of ordinary metal salts in liquid ammonia and their function in water. It will be seen, however, that in electrolytes wherein liquid ammonia is the principal solvent, "acidity" or "neutrality" may be controlled by the addition of ammonium compounds, water or acid, on the one hand, or of amides, etc., on the other.

Liquid ammonia by itself is not sufficiently conductive to serve as an electrolyte in an eelctric current-producing cell. As in the case of water in the aqueous cell systems, material freely ionizable in the solvent, ammonia, must be dissolved in the liquid ammonia in order to render it sufficiently conductive. Hence, in the cell system of the present invention wherein ammonia is the solvent added to activate the cell, there will be included in the cell cavity material which upon contact with the ammonia will render the ammonia conductive. Such material may be soluble as such in the ammonia or may be reactable with the ammonia to provide a product soluble in the ammonia and rendering it conductive. In this latter connection, the material may be, for example, barium hydroxide octahydrate which reacts with ammonia to provide ammonium hydroxide, rendering the ammonia conductive, and ammoniated barium hydroxide. Regardless of the mechanism, the material whose principal function is to combine with the ammonia, in accordance with the preferred embodiment, to provide the electrolyte will be termed herein as the electrolyte "solute." The solute will impart electromotive reactivity to the electrolyte so that the current-producing reactions will take place. Since, in accordance with the present invention, the contents of the cell compartment before activation should be inert, in this embodiment there will be no water as such, either as liquid or vapor, therein, and the solute employed will be in dry solid form as a salt or mixture of salts, a dry solid acid, or a dry solid compound which reacts with ammonia to supply dissolved material imparting conductance to the ammonia, like barium hydroxide octahydrate referred to above. The salt may be an ammonium salt or a metal salt, or mixtures thereof.

In general, the more acid the liquid ammonia electrolyte, the higher the conductivity. As stated, ammonium hydroxide and ammonium salts are acids in the liquid ammonia system. Hence, in accordance with the broader aspects of this embodiment of the invention, any ammonium salt soluble in liquid ammonia at least to the extent hereinafter discussed or any compound which forms with the ammonia either ammonium hydroxide or an ammonium salt in solution therein to a concentration hereinafter discussed, may be employed as part or all of the solute. Of the ammonium salts for use as solute in the cell cavity prior to activation, ammonium thiocyanate and ammonium perchlorate are particularly advantageous. These salts are freely soluble in liquid ammonia. Other salts that may be mentioned as being applicable are the cyanides, chlorides, cyanates, fluoborates, iodides, nitrates, nitrites, and the like. A metal salt or salts may be employed, and when the cation is a metal, it will generally be a metal above iron in the electrochemical series, particularly lithium, sodium, potassium, caesium, rubidium, calcium, strontium, barium, magnesium, zinc, aluminum, beryllium, manganese, and the like. Salts of the alkali and alkaline earth metals, especially salts of lithium, calcium and magnesium, and zinc salts are particularly preferred. Of all the salts, the ammonium salts and the lithium salts have been found to be particularly advantageous; and, in many instances, the solute will comprise a combination of ammonium and lithium salts.

The acidity that can be tolerated in any particular cell system may be limited by the nature of the other components of the cell, particularly the anode. As will be pointed out more in detail hereinafter, in some situations care must be exercised in controlling the acidity of the electrolyte to avoid undue local action at the anode. Hence, the requisite conductivity of the electrolyte may be provided in whole or in part by metal salts, which, in the ammonia system, are more or less neutral.

At any rate, the ammonium ion concentration at the anode upon dissolution of the solute in the ammonia should be such as to produce an ammonium electrode potential not substantially less than the anode potential. The exact difference between the ammonium electrode potential and the anode potential will depend primarily upon the characteristics desired in the cell as determined by the proposed application. For example, if it is desired that the cell possess a long shelf life after activation, the difference between the two potentials will normally be less than in the case of a cell in which a short useful life after activation is required. The greater the ammonium electrode potential is below the anode potential, the greater the tendency for deterioration, by chemical action, of the anode.

Since, the anode may favor one set of conditions, e.g. low acidity, and the cathode may favor another set of conditions, e.g. high acidity, the solute employed may often be a compromise between these two extreme considerations. On the other hand, the cell compartment may actually be divided into two separate sections namely, an anode section and a cathode section, with differing solutes in each, the two sections being separated by a porous or permeable diaphragm. In such case, separate electrolyte portions will be formed, namely, an anolyte and a catholyte.

There are other factors which also determine the amount of solute dissolved in the liquid ammonia to provide the electrolyte. One of the primary considerations in this connection is the temperature under which the cell is designed to operate. In general, the conductivity of the electrolyte decreases with decreasing temperature. For any given solute at any particular temperature, there is an optimum concentration of solute to provide optimum conductivity. Below and above this optimum concentration, the conductivity falls off. In other words, by plotting conductivity versus concentration of solute at any given temperature, there results a curve which starts out at the low side of conductivity, ascends to one or more peaks and then drops off again. Thus, if the cell is to operate at an exceedingly low temperature, and it is desired to provide maximum conductivity at that temperature, the concentration of solute must be controlled. When the cell is to operate at higher temperatures, such as high atmospheric temperatures or above, it is often desirable to incorporate sufficient solute to raise the boiling point of the electrolyte to above the temperature conditions to which the cell is to be subjected to avoid the use of pressure. Again, when the cell is to operate at exceedingly low temperatures, it will be necessary that the electrolyte remain as a liquid at that operating temperature. For example, with certain molar proportions of ammonium thiocyanate, ammoniated ammonium thiocyanate freezes out. Thus, when operating at these temperatures, the amount of solute employed should be substantially less than that providing, with the ammonia, the ammoniated compound which freezes out at those temperatures. For example, $NH_4SCN.NH_3$ freezes out at about $-20°$ to $-40°$ C., so that a cell designed to operate at this temperature should not have, as its entire electrolyte, a mixture of ammonium thiocyanate and ammonia in a 1:1 molar ratio.

Another factor to be taken into consideration in determining the amount of solute dissolved in the ammonia solvent is the effect of that concentration on the operation of the electrodes. For example, with some anode materials, such as zinc, the anode product, for instance zinc thiocyanate, may precipitate out in the electrolyte at high discharge rates and low temperatures if too much solute is dissolved at the anode region. When such a solid product is formed at the anode region, the anode becomes blocked increasing the internal resistance of the cell, and, in many cases, the anode potential is reduced. Similar consideration is applied to the cathode; however, the nature of the cathode material and/or type of solute will frequently result in different ranges of concentration requirements.

The above-mentioned considerations being borne in mind, the amount of solute salt actually employed may range up to the limits of its solubility in the liquid ammonia formed in the cell compartment at the temperature under consideration. The amount of solute salt may actually exceed the limits of its solubility in the liquid. Thus, aside from the questions of optimum conductivity, and of the freezing out of solvated compounds as discussed above, it is not material that excess solute salt remain undissolved in the electrolyte.

In order to provide significant current capacity in the cell, it has been found necessary to provide a concentration of solute salt in the liquid ammonia formed in the cell of at least 1 mol percent. Particularly advantageous results are obtained when the concentration is at least about 2 mol percent. As to upper concentration limits for the solute salt, it is obviously impossible to set a specific figure and say that the compositions on one side are all operable for any purpose and those on the other side are not, since much depends upon the particular solute salt or salts selected, the nature of the anode and of the cathode, the operating characteristics desired, the temperature and pressure conditions under which the cell is to be operated, and the like, all of which factors must likewise be taken into consideration in conventional aqueous current-producing cell systems. However, as stated above, the amount of solute salt employed may even exceed its solubility in the ammonia.

The foregoing discussion has dealt with the solute broadly and no distinction has been made between the situation where the electrolyte to be formed is uniform throughout and the situation where the electrolyte is formed into two components—the anolyte and the catholyte—in which the anolyte and the catholyte differ as to composition. In certain instances it is desirable that the anolyte, that is the portion of the electrolyte adjacent the anode, and the catholyte, that is the portion of the electrolyte adjacent the cathode, differ from each other as to composition. In such case the solute adjacent the cathode in the cathode section of the cell may differ from the solute adjacent the anode in the anode section of the cell. In one preferred form of this embodiment the solute adjacent the anode will comprise an ammonium salt to provide ammonium ions upon the admission of the ammonia to the cell compartment. Where the anolyte and catholyte are to differ, the anode action and the cathode section of the cell compartment may be separated from each other by means of a porous or prmeable diaphragm. Even in this case, of course, the anode and the cathode will be in ionic flow relationship.

In one preferred form of cell system in which the anolyte and catholyte differ, the anode comprises an electro-positive metal of the type discussed below, and the solute adjacent the anode for formation of the anolyte comprises a metal salt the cation of which is a metal corresponding to the electro-positive metal of the anode or a metal higher in the electromotive series than the electro-positive metal of the anode, that is, a metal of at least the same level in the electromotive series as the electro-positive metal of the anode, and may also comprise an ammonium salt to provide ammonium ions in the anolyte as discussed above; and the solute adjacent the cathode comprises an amonium salt and/or a salt the cation of which is a metal which develops an electromotive potential in liquid ammonia at least 0.75 volt less than that developed by the metal of the anode in liquid ammonia. Advantageously, in this case the cathode itself comprises a metal in elemental form corresponding to the cation of the solute salt adjacent the cathode.

Referring to the electrodes, the anode generally comprises an electro-positive metal. Any metal above iron in the electro-chemical series, particularly lithium, sodium, potassium, caesium, rubidium, calcium, strontium, barium, magnesium, zinc, aluminum, beryllium, manganese, and the like, or mixtures thereof as well as alloys containing one or more of these metals, is suitable. Of the metals, the alkali and alkaline earth metals and zinc, especially lithium, calcium, magnesium, and zinc, particularly the first, are preferred.

The exact nature of the materials selected as anode will depend upon many factors, including the characteristics desired in the cell. The characteristics desired may dictate the type of electrolyte required, which, in turn, may determine which material should constitute the anode. For example, if high voltage is the criterion, a metal which is highly active, such a lithium, calcium, and the other alkali and alkaline earth metals and alloys containing them, may be selected for the anode. If a moderate voltage is desired, less active of the alkaline earth metals, such as magnesium, and other metals such as aluminum, manganese, zinc, and alloys containing them, may be selected.

Reference has been made above to the use, as anode, of alloys containing one or more of the metals listed. The alloying of the anode metal with another, less active metal, reduces the availability of the anode metal and, hence, its chemical activity. Thus, by appropriate selection of alloys containing highly active anode metals alloyed with less active metals, it is possible to employ as anode an alloy containing a highly active metal in situations where the use of that metal by itself would be impractical. Examples of such alloys are lithium aluminum alloys, lithium amalgams, lithium zinc alloys, lithium magnesium alloys, lithium lead alloys, and the like.

The cathode, in the strictest sense of the word, is the site of the cathodic reactions. Generally, the tangible substance or substances and structure entering into the cathodic reactions are referred to as the cathode, and in this sense the cathode of the present cell system will comprise an electric current conductor for conducting electrons into the cell and any solute material for contact with the conductor included to prevent accumulations at the cathode which would block operation. The cathode employed in the present cell must be a depolarizing cathode, that is to say, it will comprise a conductor of such a structure as to physically prevent accumulation of hydrogen or other polarizing products or a conductor and a material in contact therewith which chemically prevents accumulation of polarizing products. The injection of electro-positive metal ions into the electrolyte from the anode during discharge must be coupled with a complementary withdrawal of positive ions or introduction of negative ions at the cathode otherwise the solvated proton will discharge from the electrolyte at the cathode causing the formation of hydrogen. Such formation of hydrogen not only absorbs much of the energy generated at the anode but the non-conducting bubbles or film thereof may cause partial loss of contact between the cathode conductor and the electrolyte. This effect as well as the formation of other reaction products which tend to raise the cathode potential and/or cause loss of contact between the cathode and the electrolyte are termed herein "polarization." The prevention of this phenomenon, or "depolarization," can be achieved, as stated above, by physical means or by chemical means. Referring to the former, the ability of hydrogen to diffuse through solid materials, such as carbon and metals, is well known. If the cathode conductor, consisting of such material, has access to the exterior of the cell and is provided with sufficient surface area, the hydrogen formed at the cathode will diffuse into the cathode conductor and out of the cell substantially as fast as formed. The requisite surface area may be provided by employing a highly porous cathode conductor or by providing thin protuberances, such as fins, thereon.

Preferably, depolarization is accomplished by chemical means, that is by including a material, in contact with the cathode conductor, which reacts with the polarizing products, thereby effectively preventing their accumulation. Since chemical depolarization takes place by reduction of the depolarizing material at the cathode, any reducible metal compound or non-metal in contact with the cathode conductor will be suitable for this purpose. The depolarizer may be in solution in the electrolyte contacting the cathode conductor or may be in solid form in contact with the cathode conductor. Preferably, in order to obtain significant power from the cell, the cathode will comprise, as depolarizer in contact with the cathode conductor, a compound of a metal that possesses a potential in liquid ammonia at least about 0.75 volt less than that provided by the anode metal in liquid ammonia. This metal compound may be soluble, partially soluble or insoluble in the catholyte. Metals, such as iron, manganese, nickel, copper, silver, lead, mercury, and the like, possess relatively low positive potentials or negative potentials. The metal compound employed at the cathode may, therefore, be of one of such metals so long as the algebraic difference between its potential in liquid ammonia and the potential of the anode metal in liquid ammonia is at least 0.75 volt. Examples of such metals in the form of compounds serving as depolarizers are manganese dioxide, lead oxide, lead dioxide, lead chloride, lead thiocyanate, silver oxide, silver peroxide, silver hydroxide, silver thiocyanate, silver chloride, mercury chloride, mercury thiocyanate, and the like.

As stated, the depolarizing cathode preferably comprises, in contact with the cathode conductor, a compound of a metal which possesses a potential in liquid ammonia of at least about 0.75 volt less than that possessed by the metal of the anode in liquid ammonia. Various investigators have studied and measured the potentials of metals and metal compounds in liquid ammonia, and their findings are recorded in the literature. Hence, utilizing the methods known to those familiar with current-producing cell systems, and information available in the literature, within the principles stated herein, a cathode material may be selected in any particular situation.

The depolarizing compound may be affixed to or in contact with the cathode conductor or it may be merely present in the cathode section for dispersion or dissolution in the liquid ammonia formed in the cell compartment.

The cathode conductor may be made up of a material that is inert to the electrolyte such as electrolytic carbon, platinum, boron, zirconium, tantalum, or the like. Of this group, carbon is the preferred material. However, in applications where carbon is mechanically unsuitable, a conducting depolarizer film may be used to coat and protect a reactive metal cathode conductor in the presence of a more active depolarizer.

The design or construction of the cell compartment of the present invention may vary widely depending upon the particular use intended for the cell. In one form of the cell in accordance with the preferred embodiment, there may be employed a vessel comprising a cylindrical chamber surrounded by an annular chamber. The two chambers may be separated by a porous diaphragm. The inner chamber may be the cathode section containing the cathode and suitable solute for the catholyte. The outer chamber may be the anode section containing the anode and suitable solute for the anolyte. Suitable contact terminals will be provided in each chamber to conduct current.

The manner of disposing the solute in the cell, in accordance with the preferred embodiment, may also vary widely. The solute may be in the form of a coating on one or both of the electrodes or other component of the cell, or it may be placed loosely in the cell cavity. In a preferred form of this embodiment the porous separator referred to hereinabove or other porous body may contain the solute, prepared as by impregnating the porous material with a solution of the solute and drying.

The cell may be constructed from a wide variety of relatively cheap and available materials, for example, iron, glass, ceramic material, rubber or synthetic rubber-like materials, synthetic resins, and the like. The material selected, of course, should be chemically resistant to the ammonia.

The electrodes may be of any desired shape, such as flat sheets, rolls, cylinders, bobbins, discs, or the like.

Referring then to the drawings, FIGURE 1 illustrates partly in section, a simple cell system ready for activation through the addition of ammonia vapor thereinto. 1 represents the cell casing provided with valved conduit 2. Valve 3 is closed and the system is air-tight and air-free. 4 is the anode in the form of a rod. Anode 4 is insulated from cell casing 1, when cell casing 1 is of conducting material, by suitable insulation 5. Anode 4 is connected to an external current contact terminal 6. 7 is the cathode in the form of an annular ring. Cathode 7 may also be insulated from cell casing 1, as by insulation 8. Cathode 7 is also provided with an external current contact terminal 9. In this embodiment the cathode and anode may be coated with the desired catholyte and anolyte solute, respectively, or the catholyte solute and anolyte solute may be otherwise disposed in the cathode and anode sections, respectively, for ready access by the admitted ammonia vapor. The anode section is separated from the cathode section by a permeable diaphragm 13 in the form of an annular ring.

To activate the cell device of FIGURE 1, conduit 2 is connected to a reservoir of ammonia under pressure and in liquid form, as in cylinder 10. Cylinder 10 is also provided with a valve, 11, so that once the cell device and the cylinder 10 have been tightly connected, as through union 12, valves 3 and 11 may be opened to cause the ammonia, in vapor form, to rush into the cell cavity, condensing and dissolving solute therein to form the electrolyte solution required to cause the cell to operate. To prevent air in the open ends of conduits 11 and 2 from entering cell 1, it is preferred to purge these portions of the conduits before the coupling 12 is completely tightened.

FIGURE 2 illustrates a self-contained unit comprising the ammonia container attached to the cell compartment. 21 represents the cell casing, attached to ammonia container 22 through connection 23. Anode 24 is in the form of a centrally apertured disc. Between anode 24 and cathode 26 is perforated and porous separator 27 which may be of paper, cardboard or other porous material. Separator 27 is also in the form of a centrally apertured disc, preferably serrated or otherwise provided with channels to provide ready access of the ammonia vapor thereinto, and is impregnated with solute salt. Anode 24, separator 27 and cathode 26 are insulated from the cell casing by insulation 25. Anode 24, is connected to external current contact terminal 28, and cathode 26 is connected to external current contact terminal 29.

Ammonia container 22 is, in this embodiment, provided with heating element 30 comprising a metal cylinder containing chemicals 32 which, upon initiation by heat, react, exothermally. Such heat generating material may be, for example, a mixture of zirconium metal and potassium chromate. To initiate the heat-generating reaction there is provided an electric match 31 which is capable of ignition upon the passage of a small current therethrough. Between ammonia container 22 and cell casing 21 is a rupturable diaphragm 34 capable of withstanding the pressure differential between ammonia container 22 and the cell compartment but rupturable upon any sharp increase in the pressure differential.

In operating the device of FIGURE 2, when it is desired to operate the cell, current is passed through match 31 igniting it. The ignited match in turn initiates the exothermic reaction between the components in mixture 32. The heat is transferred to ammonia 33 causing a rise in the already elevated pressure conditions existing within the ammonia container. This abrupt increase in pressure causes diaphragm 34 to break releasing the pressure on the ammonia, and causing it to expand and burst substantially as a vapor into the cell compartment. The solvent vapor rushing into cell compartment 21 is absorbed by the solute contained in separator 27, condensing and dissolving the solute and forming the electrolyte necessary for operation of the cell. The time interval between ignition of match 31 and activation of the cell is very short.

FIGURE 3 illustrates an embodiment similar to that of FIGURE 1 in which, however, the injection of the ammonia into the cell compartment is aided by a carrier gas or propellant, the device of FIGURE 3 being provided with means located on the cell compartment for venting the carrier gas away from the cell. In this embodiment 40 is the cell, which may be of the type illustrated in FIGURE 1. As in FIGURE 1, cell 40 is provided with valved conduit 41, containing valve 42. Cylinder 43 is the ammonia container which may be connected to the cell through union 44. Cylinder 43 is provided with valve 45. In this embodiment the ammonia in cylinder 43 is mixed with an inert non-condensable gas, such as argon. The mixture will be under pressure, and the vapor phase will be a mixture of ammonia and argon, and the liquid phase will be liquid ammonia saturated with argon. Once the cell and cylinder have been connected for activation of the cell and the line between the cylinder and cell purged, the opening of valves 42 and 45 causes the ammonia-argon mixture to flow in vapor form into cell 40. The argon, being non-condensable, escapes through relief valve 46, and the ammonia is absorbed by the solute, condensing and dissolving the solute to provide the desired electrolyte. As a modification of this embodiment, the propellant gas may be held in a separate container in potential fluid flow communication with ammonia in cylinder 43, and may be released into the ammonia at the time it is desired to activate the cell.

FIGURE 4 illustrates a further embodiment similar to that shown in FIGURE 2, wherein the ammonia is injected into the cell in vapor form through the aid of heat, in this case generated through chemical reaction within the body of ammonia. Cell 50 may be of the same structure illustrated in FIGURE 2, being separated from ammonia 51 held in container 52 by means of a rupturable diaphragm (not shown) as illustrated in FIGURE 2. In this embodiment a frangible ampoule 53, of material 54 reactable with ammonia 51 or a material contained therein to generate heat, is located within container 52 and in potential fluid flow communication with ammonia body 51. Ampoule 53 is held in a suitable position, such as against the bottom of container 52, by spider 55. To activate the cell in accordance with this embodiment, the ampoule 53 is broken releasing its contents 54 for reaction with ammonia body 51. This generates heat, further raising the pressure within container until the rupturable diaphragm separating ammonia 51 from the cell compartment bursts permitting the ammonia to vaporize into the cell compartment and thus activate the cell as described previously. Ampoule 53 may be broken by percussion such as through the medium of a pin striking against the bottom of container 52 adjacent the bottom of the ampoule. A suitable system for use in this embodiment involves concentrated sulfuric acid in ampoule 53, and liquid ammonia 51 which, when the ampoule is broken, results in the formation of ammonium sulfate with the evolution of heat. Other materials reactable with ammonia to produce heat are boron trifluoride, bromine, sulfur trioxide and hydrogen chloride.

FIGURE 5 illustrates another embodiment, similar to that shown in FIGURE 2 in that heat generated adjacent the ammonia body but not in situ within the ammonia is utilized to break the seal and to force the ammonia as a vapor into the cell. 60 is the cell, which may be as illustrated in FIGURE 2, and 62 is the ammonia container holding ammonia 61. Container 62 is connected to cell 60 and ammonia 61 is separated from the cell compartment by a rupturable diaphragm (not shown) as in FIGURE 2. In this case cylinder 63 contains a material 64 reactable exothermically with a second material, added through line 65 and valve. Material 64 may be, for example, liquid ammonia, and the material added thereto may be boron trifluoride which is rapidly reactive with ammonia to generate heat. In operating the embodiment illustrated in FIGURE 5, boron trifluoride, for example, is injected into liquid ammonia 64 resulting in the substantially instantaneous evolution of heat. This heat in turn heats ammonia 61 further raising the pressure within container 62 until the rupturable diaphragm bursts permitting ammonia 61 to rush as a vapor into the cell compartment with the activation of the cell as described previously.

Figure 6:
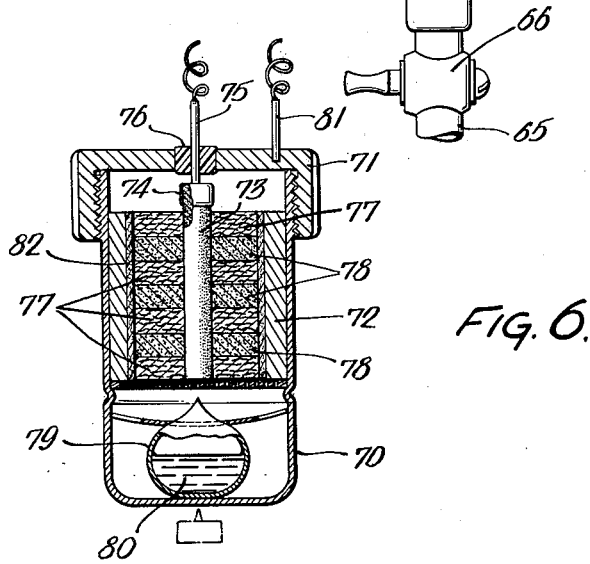
FIGURE 6 is a side elevational view in section of a cell embodiment in which the reservoir for the ammonia is a frangible ampoule located within the cell compartment.

FIGURE 6 illustrates a self-contained unit in which the ammonia is located in a rupturable ampoule within the cell compartment. In this case 70 represents the cell casing, which may be steel or other conductive material, provided with cap 71. 72 represents a magnesium casing serving as anode for the cell and 73 represents a carbon rod cathode fitted with gold cap 74. Attached to the gold cap is conductor wire 75 insulated from cap 71 by ceramic sleeve 76. 77 represents porous separator discs impregnated with solute and 78 represents sections of depolarizing material, e.g. a 2:1 mixture of manganese dioxide and carbon. 79 is a frangible ampoule containing liquid ammonia 80. Conducting wire 81 is attached to cap 71 to complete the circuit. 82 is a porous paper cylinder which may be impregnated with anolyte solute. In operation to activate the cell, ampoule 79 is broken as by pin percussion, causing the liquid ammonia to vaporize. The ammonia vapor permeates the porous separators 77 condensing and dissolving the solute contained therein to form the electrolyte. The cell is thus completed and current is generated.

As stated, the cell compartment of the preferred embodiment will be free of moisture, and, preferably also substantially free of air. Hence, in the preparation of the cell of the preferred embodiment, the cell compartment is preferably evacuated or flushed with a dry inert gas, which may be soluble in the ammonia, prior to sealing.

The present cell system provides the advantages of prior liquid-activated cell systems and, in addition, overcome many if not all of the main limitations and disadvantages thereof. One of the important features of the present cell system is the rapidity of activation. When the ammonia is admitted to the cell cavity in the form of a vapor, it readily and rapidly permeates the cell cavity and the solute with which it is to come into contact. Absorption of the ammonia vapor by the solute and dissolution of the solute in the absorbed ammonia forming the electrolyte takes place very rapidly. For example, the admission of ammonia, in vapor form, to the cell cavity results in almost instantaneous formation of the electrolyte, and activation may take place in less than a 0.1 of a second, frequently less than .01 second. Moreover, during transmission of the ammonia as a vapor into the cell cavity and thereafter, there is little or no danger of short circuiting, since the ammonia vapor, as such, is relatively non-conducting, and the ammonia substantially selectively condenses and is retained, at the site of the solute. Of course, slow or gradual activation is not excluded inasmuch as certain of the advantages of the present invention may be realized in situations where rapid activation is not a requirement and where the ammonia vapor is gradually or intermittently fed to the cell compartment when activation is desired. Another important feature is the simplicity of the present vapor activated cell system. It is not necessary, as in the case of many of the liquid activated systems, to pre-mix the electrolyte which, in many cases, would be corrosive, present storage problems and require a complex activation and electrolyte distribution system to avoid intercell shorting in the case of a battery.

Another advantageous feature of the present cell system is its unusual adaptability to a wide range of mechanical situations, designs, configurations, and dynamic circumstances and environments.

The cell, after activation can be converted back to its original state simply by evaporating and withdrawing the ammonia. This also means that the cell system can be readily tested, for example after manufacture or after standing unactivated for a long period of time, by injecting a small amount of the ammonia and noting the response. The ammonia can then be evaporated and withdrawn, the cell resealed with assurance that it is ready for use upon subsequent activation. This procedure can also be employed to insure that the cell components are in a highly active state when during manufacture one or more of the components may have its chemical reactivity impaired, as by surface oxidation, and partial or complete activation followed by removal of ammonia and evacuation or adding an inert gas atmosphere to the cell compartment removes oxide film thus preparing the cell for rapid service.

By the present invention, electric current-producing cells possessing, upon activation, outstanding current-producing characteristics over a wide range of temperatures from the highest atmospheric temperature encountered or even higher, to even below the freezing point of liquid ammonia, can be produced. Practical cells can be produced in accordance with the present invention which are capable, upon activation, of developing as high as 3.5 volts or more at significant current levels. It is not possible as a practical matter to prepare an aqueous cell system where such potentials can be realized.

The following examples illustrate further the present invention, and are not intended to limit the scope of the invention in any way.

*Example 1*

In this example an assembly generally as described in connection with FIGURE 2 is prepared, the casing being of steel, the anode being magnesium metal, the cathode being carbon and the separator being impregnated with about 90 mg. of anhydrous ammonium thiocyanate. A layer of a 2:1 mixture of $MnO_2$:carbon is also provided between the separator and the cathode. In the ammonia container is about 4 grams of liquid anhydrous ammonia. Within the ammonia container is a heating device comprising an electric match imbedded in a 3:1 mixture of potassium chromate:zirconium metal. The cell compartment has a volume of about .05 cubic inch.

The cell compartment is evacuated, and the ammonia container is attached thereto, the ammonia being separated from the cell compartment by a diaphragm adapted to rupture at about 300 p.s.i.

Activation is achieved by ignition of the match by means of an external electrical signal of 1.5 volts. At 0.1 second after ignition of the match the cell is activated to deliver a peak voltage of 1.64 volts under a load of 100 ohms, rising to a peak voltage of 2.34 volts at 360 seconds, and gradually decreasing to 1.64 volts at 2280 seconds, having delivered over this period of time an energy of 122 joules.

Under a 15 ohm load, the cell reaches a peak voltage of 1.81 volts and delivers 150 joules within the stated period.

Example II

In this example an assembly generally described as in connection with FIGURE 6 is prepared; the cell casing, of cold drawn steel, having an inner diameter of .495 inch and 2.87 inches long; the anode being a magnesium cylinder with an inner diameter of .375 inch and 1.125 inches long; the cathode being a carbon rod .125 inch in diameter; the paper cylinder adjacent the anode being impregnated with magnesium thiocyanate (prepared by dipping the paper in a saturated aqueous solution of magnesium thiocyanate and drying); the depolarizer layers (six) being about .08 inch thick and consisting of a 2:1 mixture of manganese dioxide and acetylene black; the separators between the depolarizer layers being paper about .08 inch thick and impregnated with ammonium thiocyanate (prepared by immersing the paper in a saturated aqueous ammonium thiocyanate solution and drying), and there being 0.5 cc. of liquid anhydrous ammonia in a glass ampoule and under a pressure of 125 p.s.i. at room temperature. The cell is evacuated.

The cell is activated by striking the casing adjacent the glass ampoule sufficient to break the glass ampoule. Within 5 second after the ampoule is broken the voltage reaches 1.06 volts (under a 3 ohm load), and a peak voltage of 1.68 volts in two minutes. At six minutes the voltage had dropped to 1.0 volt.

A commercial size N flashlight cell delivers 1.10 volts initially under a 3 ohm load, and the voltage drops to 0.76 volt after six minutes.

Example III

In this example a cell assembly is prepared as in Example II except that the anode casing is zinc and the paper cylinder adjacent the zinc casing is impregnated with ammonium thiocyanate.

Upon activation, under a 20 ohm load, the cell delivers 1.4 volts within 5 seconds, the voltage continuing at this level with negligible decrease for ten minutes. At the end of this period, the load is reduced to 3 ohms and a potential of 1.25 volts is observed after 5 seconds at this load dropping gradually to 0.76 volt after sixteen minutes.

Example IV

A cylindrical pot cell form of this invention is constructed readily in the following manner:

A hermetically sealing steel pressure cylinder internally 6 inches in diameter and 6 inches high is fitted with the following items. The top piece or lid is provided with ⅛ inch standard female pipe thread cathode and anode ports located radially between 1¾ and 2¾ inches from the vertical axis of the cylinder, and an electrically insulated hermetically sealed ½ inch diameter threaded steel cathode contact and supporting rod extending 1½ inches below and 1½ inches above the lid to form the positive terminal. A 3 inch diameter, 5 inches long graphite cylinder is axially bored and threaded to match the lower extension of the cathode contact and supporting rod. This cathode cylinder is then machined to form 8 horizontal circular fins tapering radially from ¼ inch thick at the periphery to a solid core 1 inch in diameter at the bottom to 2 inches in diameter 1 inch from the top. The cathode is then firmly screwed to the lower extension of the cathode contact and supporting bar using a thin even coating of acrylic lacquer as a seal and lubricant. The lacquer solvent is allowed to thoroughly air dry. A cylindrical porous ceramic cup, 4 inches i.d., and ¼ inch thick is placed in the cell pot extending from the lid to ½ inch from the bottom with provision for vertical and lateral support.

To the outer chamber of this assembly are added 0.43 pound of anhydrous lithium thiocyanate and 0.035 pound of lithium metal. Into the inner chamber are placed 0.49 pound of ammonia thiocyanate. The top is tightly sealed to the pot.

The ports are connected by appropriate ⅛ inch steel fittings through a check valve open only when the cell is in an approximately upright position. A combination valved solvent-aluminum port and pressure relief valve is also connected to the cathode port. The entire assembly is then evacuated via this port, and the cell is maintained at 70° F.

Activation of the cell is accomplished by connecting the cell activation port to a tank of anhydrous liquid ammonia maintained at a temperature of 100° F. and opening the valves to admit 1.43 pounds of ammonia as a vapor, there being electrical connection of a suitable load between the cell body and the external extension of the cathode contact and supporting rod. Following equalization on standing or mild discharge a potential in the neighborhood of 2½ volts, depending upon the load, is obtained and the cell has a capacity in the order of 75 ampere hours at −40° F.

Example V

In this example a cell similar to that used in Example I is employed and is connected to a tank of liquid ammonia heated to 100° F. Upon opening the valve between the ammonia tank and the cell compartment, a potential, under load, of 1.1 volts in 0.02 second and 1.5 volts in 0.05 second.

Following the principles described herein, cells have been made which, after activation, have delivered over 2 volts for fourteen hours of continuous drain under a load of 1300 ohms, the delivery gradually dropping to about 1.70 volts over the next succeeding six hours.

As is apparent to one familiar with the current-producing cell art, considerable modification is possible in the selection of solvent, solute, anode and cathode and in structural details as well as in the manner of operation, without departing from the scope of the present invention.

I claim:
1. A vapor-activatable electric current-producing cell device comprising a gas-tight cell compartment substantially free of air and, within said cell compartment, an anode comprising an electropositive metal above iron in the electrochemical series, a cathode, catholyte solute free of any electrolyte solvent and comprising a salt the cation of which is selected from the group consisting of ammonium and metals which develop an electrolytic potential in liquid ammonia at least 0.75 volt less than that developed by the metal of said anode in liquid ammonia, and means for introducing ammonia in the vapor state to said compartment for contact with said solute.

2. The product of claim 1 containing as anolyte solute at least one salt selected from the group consisting of ammonium, alkali metal and alkaline earth metal salts; wherein said catholyte solute comprises an ammonium salt, and wherein said cathode comprises a compound of a metal which develops an electrolytic potential in liquid ammonia at least 0.75 volt less than that developed by the metal of said anode in liquid ammonia.

3. A vapor-activatable electric current-producing cell device comprising a gas-tight cell compartment substantially free of air and, within said cell compartment, an anode comprising an electropositive metal above iron in the electrochemical series, a depolarizing cathode and electrolyte solute free of any electrolyte solvent and comprising at least one salt selected from the group consisting of ammonium, alkali metal and alkaline earth metal salts, and means for introducing ammonia in the vapor state to said compartment for contact with said solute.

4. A vapor-activatable electric current-producing cell device comprising a gas-tight cell compartment substantially free of air and, within said cell compartment, an anode comprising an electropositive metal above iron in the electrochemical series, a depolarizing cathode comprising a compound having an electrolytic potential in liquid ammonia at least about 0.75 volt less than that developed by the metal of the anode in liquid ammonia and electrolyte solute free of any electrolyte solvent and comprising at least one salt selected from the group consisting of ammonium, alkali metal and alkaline earth metal salts, and means for introducing ammonia in the vapor state to said compartment for contact with said solute.

5. A vapor-activatable electric-current producing cell device comprising a gas-tight cell compartment and, within said compartment, an anode comprising an electropositive metal above iron in the electrochemical series, a cathode comprising a compound of a metal which develops an electrolytic potential in liquid ammonia at least 0.75 volt less than that developed by the metal of said anode in liquid ammonia, catholyte solute free of any electrolyte solvent and comprising an ammonium salt, and means for introducing ammonia in the vapor state to said compartment comprising a reservoir within said cell compartment containing liquid ammonia, said reservoir having a frangible wall separating said ammonia from said cell compartment.

6. A vapor-activatable electric current-producing cell device comprising a gas-tight cell compartment and, within said compartment, an anode comprising an electropositive metal above iron in the electrochemical series, a depolarizing cathode and electrolyte solute free of any electrolyte solvent, and means for introducing ammonia in the vapor state to said compartment for contact with said solute comprising a reservoir containing liquid ammonia, and means for obtaining open-gas flow between said cell compartment and said reservoir.

7. The method of activating an electric current-producing cell to generate current therewith which comprises introducing to a cell compartment comprising an anode comprising an electropositive metal above iron in the electrochemical series, a depolarizing cathode and electrolyte solute free of any electrolyte solvent, ammonia in the vapor state and, in said cell compartment, condensing said ammonia and dissolving said solute therein, the circuit with an external load between the anode and cathode being completed.

8. The method of claim 7 wherein said electrolyte solute comprises at least one salt selected from the group consisting of ammonium, alkali metal and alkaline earth metal salts.

9. The method of claim 8 wherein the cation of said electrolyte solute salt is of at least the same level in the electromotive series as the electropositive metal of the anode.

10. The method of claim 8 wherein said depolarizing cathode comprises a compound of a metal which develops an electrolytic potential in liquid ammonia at least 0.75 volt less than that developed by the metal of said anode in liquid ammonia.

11. The product of claim 1 containing, as anolyte solute, at least one salt selected from the group consisting of ammonium, alkali metal and alkaline earth metal salts.

References Cited in the file of this patent

UNITED STATES PATENTS

| | | |
|---|---|---|
| Re. 21,100 | Greger | May 30, 1939 |
| 750,250 | Bryan | Jan. 26, 1904 |
| 1,182,759 | Emanuel | May 9, 1916 |
| 1,401,671 | Chubb | Dec. 27, 1921 |
| 2,384,463 | Gunn et al. | Sept. 11, 1945 |
| 2,433,024 | Burgess | Dec. 23, 1947 |
| 2,502,723 | Harriss | Apr. 4, 1950 |
| 2,543,106 | Harriss | Feb. 27, 1951 |
| 2,594,879 | Davis | Apr. 29, 1952 |
| 2,610,985 | Schumacher | Sept. 16, 1952 |
| 2,615,931 | Hatfield | Oct. 28, 1952 |
| 2,810,776 | Brill et al. | Oct. 22, 1957 |
| 2,863,933 | Minnick et al. | Dec. 9, 1958 |

OTHER REFERENCES

Journal American Chem. Society, 36, pages 864–77, May 1914.

Journal of Chemical Education, volume 12, page 177, and volume 13, page 235.